US012612970B2

(12) United States Patent
Matz et al.

(10) Patent No.: US 12,612,970 B2
(45) Date of Patent: Apr. 28, 2026

(54) HARD SEALING RING HAVING AN ANTI-FRICTION SURFACE, ANTI-FRICTION SEALING DEVICE, AND PRODUCTION METHOD

(71) Applicant: Procudi GmbH, Augsburg (DE)

(72) Inventors: Marc-Manuel Matz, Kissing (DE); Jeffrey Lee Hamilton, Swisher, IA (US)

(73) Assignee: Procudi GmbH

( * ) Notice: Subject to any disclaimer, the term of this patent is extended or adjusted under 35 U.S.C. 154(b) by 0 days.

(21) Appl. No.: 18/843,209

(22) PCT Filed: Feb. 28, 2023

(86) PCT No.: PCT/EP2023/055002
§ 371 (c)(1),
(2) Date: Aug. 30, 2024

(87) PCT Pub. No.: WO2023/165984
PCT Pub. Date: Sep. 7, 2023

(65) Prior Publication Data
US 2025/0109796 A1 Apr. 3, 2025

(30) Foreign Application Priority Data
Mar. 4, 2022 (DE) ..................... 20 2022 101 203.2

(51) Int. Cl.
*F16J 15/34* (2006.01)

(52) U.S. Cl.
CPC ....... *F16J 15/3496* (2013.01); *F16J 15/3404* (2013.01)

(58) Field of Classification Search
CPC ... F16J 15/3404; F16J 15/3496; F16J 15/3464
See application file for complete search history.

(56) References Cited

U.S. PATENT DOCUMENTS 3,086,782 A 4/1963 Peickii et al.
3,623,737 A * 11/1971 Eckert .................... F16J 15/344
277/382

(Continued)

FOREIGN PATENT DOCUMENTS

DE 10 2004 042 385 A1 3/2006
EP 1437537 A2 7/2004
JP H07-103 337 A 10/2003

OTHER PUBLICATIONS

German Patent Office, "International Search Report & Written Opinion", issued in connection with International Patent Application No. PCT/EP2023/055002, dated May 19, 2023 (17 pages).

(Continued)

*Primary Examiner* — Gilbert Y Lee
(74) *Attorney, Agent, or Firm* — Holland & Hart LLP

(57) ABSTRACT

The present disclosure relates to a hard sealing ring with an annular body which has a rotationally symmetrical basic shape with respect to an axis. The annular body has, in a cross section which lies in the direction of the axis, a contact portion which is arranged on an end face of the annular body. The contact portion points outwards in the direction of the axis. Furthermore, the annular body has a trough portion in the cross section, which is arranged on a radial lateral surface of the annular body and faces away from the contact portion with respect to the direction of the axis. The annular body has an anti-friction coating on the contact portion, which is in particular formed in one or more layers. The disclosure further relates to an anti-friction hard sealing device comprising a first hard sealing ring and a second hard sealing ring, each having a contact portion, the hard sealing rings being arranged adjacent to and coaxial with each other along the axis in the intended mounting position, so that the contact portions contact each other circumferentially.

55 Claims, 9 Drawing Sheets

(56)  References Cited

U.S. PATENT DOCUMENTS

| | | | |
|---|---|---|---|
| 4,824,123 | A | 4/1989 | Chia |
| 9,714,713 | B2 | 7/2017 | Antoine |
| 10,746,301 | B2 | 8/2020 | Marchione et al. |
| 2011/0121518 | A1 | 5/2011 | Peng |
| 2016/0369896 | A1 | 12/2016 | Thorson et al. |
| 2017/0335969 | A1 | 11/2017 | Spangler et al. |

OTHER PUBLICATIONS

German Patent Office, "International Preliminary Examination Report", issued in connection with International Patent Application No. PCT/EP2023/054778, dated Oct. 17, 2023 (8 pages).

* cited by examiner

41

43

45   40

42

+A

44

45

40,Q'       8,9,11

40,Q'

8,9,11

40,Q'

8,9,11

64    66    102,106

109

62,1,2

— · — · — · — · — · — · A

64    Z    102,106

26, 27

62,1,2

— · — · — · — · — · — · A 64    109    102,106

26, 27

28    62,1,2

— · — · — · — · — · — · A 64    102,106

26, 27

28    62,1,2

— · — · — · — · — · — · A

HARD SEALING RING HAVING AN ANTI-FRICTION SURFACE, ANTI-FRICTION SEALING DEVICE, AND PRODUCTION METHOD

CROSS REFERENCE

The present application for patent claims priority to International Patent Application No. PCT/EP2023/055002 by Matz et. al., entitled "HARD SEALING RING HAVING AN ANTI-FRICTION SURFACE, ANTI-FRICTION SEALING DEVICE AND PRODUCTION METHOD," filed Feb. 28, 2023, which claims priority to German Application No. DE2022/20101203 by Matz et. al., entitled "HARD SEALING RING HAVING AN ANTI-FRICTION SURFACE, ANTI-FRICTION SEALING DEVICE AND PRODUCTION METHOD," filed Mar. 4, 2022, each of which is assigned to the assignee hereof, and each of which is expressly incorporated by reference in its entirety herein.

TECHNICAL FIELD

The present disclosure relates to a hard sealing ring, an anti-friction sealing device with at least two hard sealing rings and an associated manufacturing technique.

BACKGROUND

Some sealing concepts based on hard sealing rings with a sliding surface are not optimally designed and have disadvantages in manufacturing. In particular, they are difficult to adapt to new operating conditions and require high investments in tool costs in order to provide new design variants of hard sealing rings.

In some examples, hard sealing rings with sliding surfaces are generally produced by centrifugal casting, gravity casting or precision casting in relatively complex multi-part molds, which means that a new tool may be provided for each desired shape of hard sealing ring. Production by forging or deep drawing from ring-shaped preliminary products is also possible, which also means a high cost for the provision of tools. Furthermore, the production methods may utilize a high amount of energy and materials.

SUMMARY

An objective of the present disclosure is to provide an improved sliding hard sealing ring, an improved anti-friction sealing device and an improved production method.

The aforementioned objective is achieved by a plurality of aspects, each individually or in combination, whereby these aspects each provide both separate and synergistic advantages. These aspects are explained below, both individually and in certain combinations. However, they can be used in any other combination. In particular, all sub-combinations of the separately disclosed aspects are envisaged, both in terms of the method of manufacture and in terms of the design of the hard sealing rings and sliding hard sealing devices.

The hard sealing ring according to the present disclosure comprises an annular body having a rotationally symmetrical basic shape with respect to an axis. The annular body also has a contact portion in a cross section that lies in the direction of the axis. This contact portion is arranged on an end face of the annular body, which faces outwards in the direction of the axis.

The contact portion is the functional area of the hard sealing ring on which a sliding surface is or will be formed.

The annular body also has a trough portion in the cross section, which is arranged on a radial lateral surface of the annular body and faces away from the contact portion with respect to the direction of the axis.

The trough portion is the functional area of the hard sealing ring at which a bearing is provided in relation to a machine part or a component, in particular by means of an additional soft sealing ring. The trough portion can have any shape, in particular the shape of a full trough with a two-sided boundary or with two lateral support areas, or the shape of a half trough with only one-sided boundary or only one lateral support area. The additional soft sealing ring is preferably connected to the hard sealing ring and arranged on the trough portion. The soft sealing ring can be accommodated or inserted in the trough portion and can be supported or supported on at least one side, preferably on two sides by the boundary of the trough portion.

In other words, the annular body has the macro shape of a circular ring and a profiled cross-sectional shape with at least one contact portion on an axial end face and a trough portion on a radial lateral surface.

The annular body has an anti-friction coating on the contact portion. The anti-friction coating can form the actual sliding surface of the hard sealing ring. Its properties can be adapted to a desired application. In this way, the annular body itself can be manufactured from a material that is subject to different or lower requirements, in particular with regard to the achievable hardness (surface hardness), wear resistance, mechanical (re) machinability, elasticity, temperature resistance, thermal conductivity, etc.

An anti-friction hard sealing device according to the present disclosure comprises a first hard sealing ring and a second hard sealing ring, each having a contact portion, the hard sealing rings being arranged adjacent to and coaxial with each other along the axis in the intended mounting position, so that the contact portions contact each other circumferentially. At least one of the hard sealing rings preferably has an anti-friction coating on the contact portion.

The anti-friction sealing device may be used to seal against a liquid and/or gas leakage at a contact zone between two components which can rotate relative to each other about the axis (A), the hard sealing rings forming a circumferential dynamic seal in the contact area between the contact portions (3). This seal separates a first compartment and a second compartment, which lie adjacent to each other in the radial direction on either side of the pairing of hard sealing rings. When the two components rotate relative to each other, one of the hard sealing rings is entrained by one component and the other hard sealing ring is entrained by the other component, so that sliding contact with direct contact and relative movement between the contact portions of the hard sealing rings occurs in the circumferential direction around the axis.

By providing an anti-friction coating on the contact portion of at least one of the hard sealing rings, the sliding properties can be specifically improved and the service life increased.

According to a first aspect of the disclosure, at least one of the annular bodies can be produced by shaping from a cut-to-length starting material which is bent into an annular shape and joined at the ends. The starting material can be in the form of straight or bent material, in particular as wound material on a coil.

A hard sealing ring according to the present disclosure may be defined by the fact that it is manufactured according to a specific process. The disclosure of a hard sealing ring produced by a particular method is also representative of the disclosure of the production method itself, and vice versa. The production method may comprise one or more process aspects which have independent inventive merit. These process aspects serve the manufacture and can be used individually or in any combination.

A first process aspect for producing a hard sealing ring can comprise the following steps: Providing a semifinished product with an elongated or straight extent; shaping, in particular roll-forming, further in particular roll-stamping the semifinished product and forming a preliminary product with an open annular shape; joining the ends of the preliminary product to form an annular body with a rotationally symmetrical basic shape with respect to an axis (A) and with a closed circumference.

The aforementioned design and manufacturing method of a hard sealing ring can be used on its own or in any combination with the provision of an anti-friction coating. It has the particular advantage that a large variety of hard sealing rings with any predeterminable diameters can be produced with just one set of tools, in particular one set of roll-stamping rollers. It is therefore not necessary to provide a separate tool or set of tools for each diameter or shaping variant.

The cross-sectional profile of the hard sealing ring to be produced can also be variably preset with just one tool set, for example by adapting the relative distances and orientations of the rollers to each other and/or adapting the arrangement sequence of the rollers.

An advantageous further development of the so-called manufacturing aspect provides that the semifinished product has a body region which forms the contact section on the (later) annular body, whereby at least a first coating layer for an anti-friction coating is already provided on the body section of the semifinished product before or during the formation of the annular body.

According to a further aspect of the present disclosure, the annular body can have a cavity in the cross section. The cavity can be located facing away from the contact portion on the one hand and facing away from the trough portion on the other hand. As a result of the cavity, the annular body can be formed with a particularly low requirement for base material, in particular with the same or even increased mechanical load-bearing capacities against twisting. The wall sections of the annular body, which run essentially perpendicular to the axial direction and delimit the cavity, have the effect of stiffening the cross section in particular. The cavity can remain free and, for example, be wetted by a lubricant during intended operation. This can significantly improve heat dissipation compared to a solid material. Alternatively or additionally, a filler can be arranged in the cavity. The filler can be a separate body. It can be formed from the same base material as the annular body. For example, it can be a support structure that is formed in a shapeless manufacturing process (3D printing) or using an additive manufacturing process. Alternatively or additionally, the filler can have a different material as the base material of the annular body. In particular, the filler can be formed by a less expensive material and/or by a material with a lower surface hardness. Alternatively or additionally, the filler may be formed by a material with a higher thermal conductivity. Again alternatively or additionally, the filler may comprise a material that locally changes and in particular increases the stiffness (the modulus of elasticity). The filler can be a passive body. Alternatively, it can be an active body or comprise an active body. An active body can be a sensor or an actuator, for example.

By providing a cavity and possibly a filler, the properties of the hard sealing ring in terms of surface hardness, elasticity, weight, thermal conductivity and cost can be freely adjusted within wide limits without requiring any special additional effort in terms of manufacturing tools. In particular, a wide variety of different shapings of plastics and/or metals can be introduced into the cavity to form a filler, depending on the application requirements.

The formation of a cavity is independent of whether the annular body or its preliminary product is partially or completely formed by shaping or primary forming.

A further aspect of the present disclosure provides for a production method in which the annular body of the hard sealing ring is formed (at least in part) by primary forming and has a homogeneous annular shape that is free of joints in the circumferential direction. According to the present disclosure, the term primary forming includes both mold-bound production, such as centrifugal casting, hard casting or gravity casting, as well as mold-free production by additive material application (3D printing). Manufacturing by primary forming can be combined with the above-mentioned manufacturing technique by shaping. In particular, it is possible to produce a semifinished product with an elongated or straight extent by primary forming in a first step, which is then shaped to form a preliminary product with an open ring shape. The above-mentioned steps can then be carried out again to produce a closed ring shape.

Alternatively, according to a further example of the present disclosure, the closed annular body may be formed directly by primary forming. Possibly, the trough portion can be formed by shaping in a further processing step.

A further manufacturing aspect of the disclosure provides that at least the following manufacturing steps are present: Providing a negative mold with a profiled contour and producing a closed annular body by primary forming, in particular by casting, further in particular by aluminum die casting, so that the annular body has a basic shape which is rotationally symmetrical with respect to an axis and has, in a cross section which lies in the direction of the axis, a contact portion which is arranged in the direction of the axis (A) on an outward-facing end face, and a trough portion which is arranged on a radial lateral surface of the annular body and lies facing away from the contact portion with respect to the direction of the axis.

An annular supplementary material can be introduced into the negative mold before or during the primary molding process to form an anti-friction coating on the contact portion. Alternatively or additionally, a supplementary material can be introduced that locally changes and in particular increases the modulus of elasticity.

A further aspect of the present disclosure provides that a protective coating is provided on the annular body in a radial surface portion which lies between, on the one hand, the trough portion and, on the other hand, the contact portion, in particular on a radial circumferential surface of a band collar. The protective coating can consist at least in part of the same material as the anti-friction coating on the contact portion. Alternatively, it can be made of a different material. The protective coating can consist of one or more layers, in particular two layers. It has been shown in practice that in the installation position, material damage in the area of the anti-friction coating or in the area of the contact zone usually limits the service life of the hard sealing ring. In individual cases, however, foreign matter and, in particular, hard particles are also introduced into an area between a housing part and the radial surface portion on the annular body, which lies between the trough portion on the one hand and the contact portion on the other, in particular on a radial circumferential surface of the band collar. The application of a protective coating to this area makes the hard sealing ring more resistant to mechanical influences from such foreign substances, which improves the reliability of the hard sealing ring and allows a more accurate prediction of the achievable service life.

A further aspect of the present disclosure provides that on the radial lateral surface of the annular body, in particular in the region of the trough portion, there are surface portions which are adjacent to one another in the axial direction and have a different adhesion-promoting effect. Preferably, a surface portion limited in the axial direction is provided on the trough portion, which covers only a part of the trough portion, this surface portion having an increased adhesion-promoting effect compared to a soft sealing ring that can be placed there, in particular due to the presence of an adhesion-promoting supplementary material and/or due to the presence of an adhesion-promoting surface structure. An adhesion-promoting supplementary material can, for example, be a coating material that differs from the base material of the annular body. An adhesion-promoting surface structure can be, for example, a roughening or surface texturing. The hard sealing ring is supported in the intended mounting position by a soft sealing ring. It has been shown that a malfunction or premature wear of the hard sealing ring can occur if the soft sealing ring has a local twist or misalignment in the mounting position. Such twisting or incorrect positioning may occur when the hard sealing ring is inserted into the housing. Due to the locally different adhesion effect and in particular due to an increased adhesion effect on the aforementioned surface portion, it is achieved that a soft sealing ring, which is placed on the trough portion, performs a controlled and uniform rolling movement between the trough portion on the one hand and the housing on the other hand when it is inserted into a housing. This prevents twisting of the soft sealing ring and promotes or ensures correct positioning in the mounting position. This also improves the reliability of the hard sealing ring and allows a more accurate prediction of the achievable service life.

A further aspect of the present disclosure provides that the anti-friction coating has a multi-layer design and, in particular, has two or more separate coating layers that overlap in the direction of the axis. The multi-layer design can have various examples, both in terms of the physical design and in terms of the manufacturing method, which can be combined with one another as desired.

Alternatively or additionally, it may be provided that the anti-friction coating has at least one graded coating layer with an inhomogeneous material structure. The material structure of the graded coating layer can have at least two zones, in particular in cross section and in the direction of the axis, and further in particular a plurality of zones in which different material mixtures and/or different concentrations of hard particles and/or self-lubricating substances are present. For example, a high concentration of hard particles can be provided in a first zone, which is close to the annular body in the direction of the axis, in order to generate permanent sliding properties. In a second zone, which is located away from the annular body in the direction of the axis, in particular in an outer edge zone of the anti-friction coating, a high concentration of self-lubricants can be present, in order to produce running-in properties. There may be a gradual transition in the concentration(s) of hard particles and/or self-lubricants between these zones. The gradual transition can be smooth or divided into further intermediate zones.

According to a first example, it is provided that the anti-friction coating comprises a wear-resistant permanent sliding layer and, on the other hand, a separate running-in layer. Preferably, the running-in layer is arranged in superposition to the wear-resistant permanent sliding layer. Alternatively, it can be provided next to or overlapping the permanent sliding layer.

According to a further example, a first coating layer can be applied to a semifinished product or to a preliminary product that is joined to form an annular body that is closed in the circumferential direction, with at least one further coating layer of the anti-friction coating being applied only after joining.

In this way, a joining point can be covered or laminated in the circumferential direction with the at least one further coating layer. Preferably, somewhat lower tolerance requirements can be provided for the forming process to form the annular body without negatively affecting the sealing effect and the concentricity properties.

A further aspect of the present disclosure provides that the trough portion comprises a central region and at least one adjacent lateral support area which is located in the direction of the axis on the side of the central region remote from the contact portion, this lateral support area being formed by a collar.

According to a first example, the longitudinal extension of the collar in cross section can be greater than its thickness by a factor x, where x is at least 1.5 and is preferably between 2 and 4. As a result, the collar has an essentially flat and narrow-walled hollow cylindrical shape, so that the collar can be subjected to further processing by shaping by simple means, regardless of whether the annular body was originally produced by shaping or primary forming. In particular, the collar can initially have a longitudinal extension in cross section that is oriented in the direction of the axis. In other words, it may be an axial collar.

According to a further example, which can be used on its own or in combination with the aforementioned example, the lateral support area of the trough portion for an intended mounting position can be additionally bent or flanged compared to an initial shape during the manufacture of the annular body, so that its longitudinal extension is inclined more towards the trough portion in cross section. Various advantages can be achieved by this additional bending or flanging of the lateral support area, in particular a collar. On the one hand, the hard sealing ring can be adapted to different shapes of a soft sealing ring, via which the hard sealing ring can be mounted on a component. Furthermore, the effective width of the trough portion can be adapted or adjusted by bending or flanging the additional shaping of the lateral support area. In this way, a hard sealing ring can be specifically adapted for pairing with a selection of soft sealing rings for a wide range of application options.

The aforementioned examples are preferably accompanied in an annular body produced by primary forming in that an undercut is formed on the annular body on the side of the lateral support area facing away from the trough portion (5). The undercut is preferably provided in such a way that the material thickness in the area of the lateral support area is significantly less than in the central region of the trough portion.

In summary, the present disclosure thus demonstrates a technique for providing hard sealing rings with which modular manufacturability is achieved, which allows both inexpensive large-volume production (die casting) and the production of individual pieces or small quantities for special applications, with maximum adaptability of the hard sealing rings to the respective application requirements.

Further advantageous examples of the disclosure are explained in the sub-claims of the following description and in the accompanying drawings.

BRIEF DESCRIPTION OF THE DRAWINGS

The present disclosure is illustrated schematically and by way of example in the drawings. These show.

DETAILED DESCRIPTION

Figure 1:
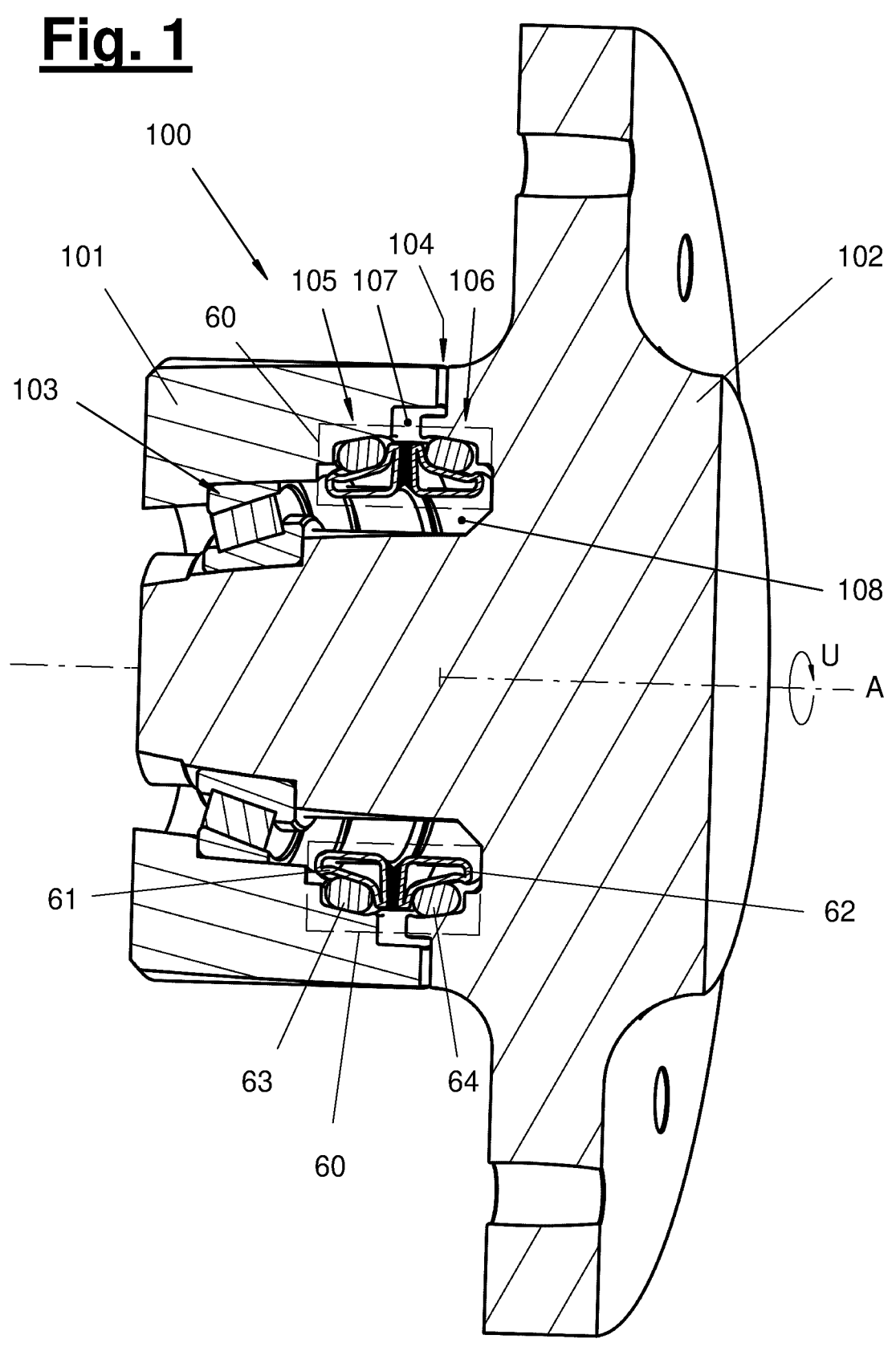
FIG. 1: A sectional view of an assembly group with an anti-friction sealing device according to the present disclosure in the intended mounting position.

FIG. 1 shows a preferred example of an anti-friction sealing device (60) in an intended mounting position on an assembly group (100). The assembly group (100) comprises a first constructional part (101) and a second constructional part (102), which are mounted relative to one another about an axis (A). In this example, the bearing is provided by a rotational bearing (103), in particular a cylindrical roller bearing.

A gap (104) is formed between the constructional parts (101, 102), which extends at least partially in a radial plane in relation to the axis (A). A transfer of liquid or gas between the inner space and the outer space of the assembly group (100) could take place through this gap (104). In order to prevent or limit such a transfer, an anti-friction sealing device (60) according to the present disclosure is arranged between the constructional parts (101,102).

The anti-friction sealing device (60) comprises a first hard sealing ring (61) and a second hard sealing ring (62), which are arranged adjacent to and coaxial with each other along the axis (A) in the intended mounting position shown.

Figure 2:
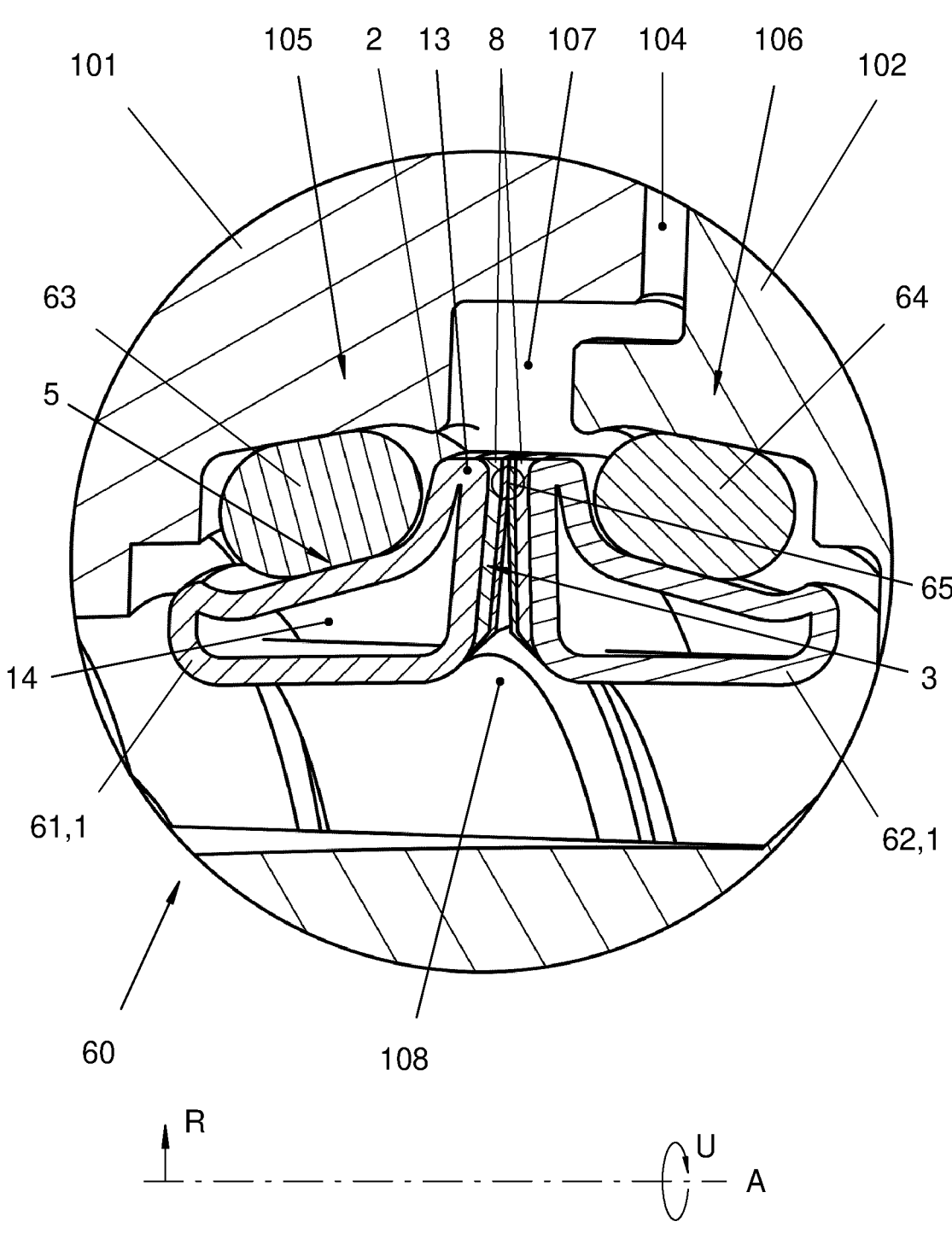
FIG. 2: An enlarged detailed view of a section of FIG. 1.

FIG. 2 shows an enlarged detailed view of the upper half of the anti-friction sealing device (60) according to FIG. 1.

Figure 10:
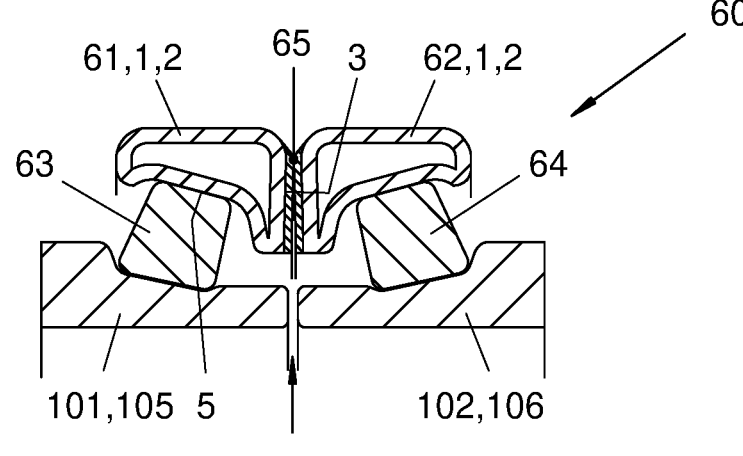
FIGS. 10 and 11: A cross-sectional view of further examples of an anti-friction sealing device.
Figure 10:
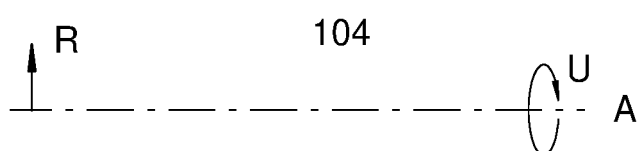

At least one and preferably both hard sealing rings (61,62) are formed according to the present disclosure. One such hard sealing ring (61, 62) comprises an annular body (2, 2') which has a rotationally symmetrical basic shape with respect to the axis (A). The annular body has, in a cross section (Q) which lies in the direction of the axis (A), a contact portion (3) which is arranged on an end face of the annular body (2, 2'), the contact portion (3) pointing outwards in the direction of the axis (A). Furthermore, the annular body (2, 2') comprises a trough portion (5) in cross section (Q), which is arranged on a radial lateral surface of the annular body (2, 2') and faces away from the contact portion (3) with respect to the direction of the axis (A). In the examples of FIGS. 1 to 7, the trough portion (5) is arranged on a lateral surface of the annular body (2, 2') pointing outwards in the radial direction. FIG. 10 shows an alternative example in which the trough portion (5) is arranged on a lateral surface of the annular body (2, 2') facing inwards in the radial direction.

The annular body (2, 2') has an anti-friction coating (8) on the contact portion (3). The anti-friction coating (8) can be single-layered or preferably multi-layered. In particular, it can have two or more separate coating layers (9, 10), which overlap at least partially in the direction of the axis (A).

Sealing receptacles (105, 106) of any suitable shape can be provided on the constructional parts (101, 102). A sealing receptacle (105, 106) can, for example, have the basic shape of an annular groove with an inclined lateral surface. Alternatively, it can have any other shape.

Figure 11:
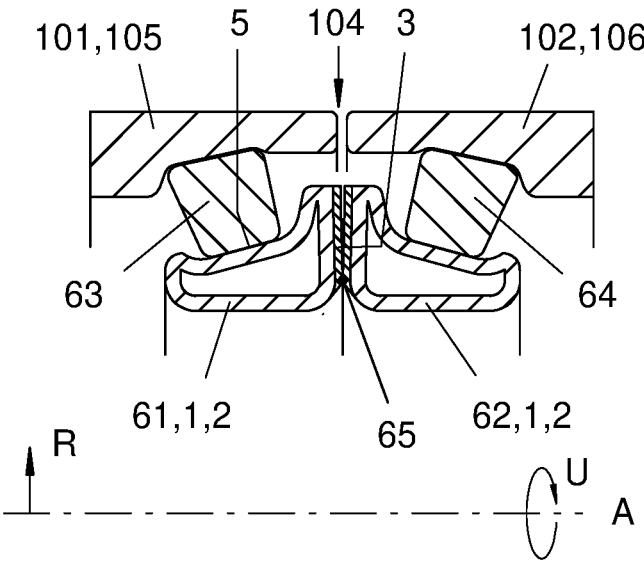

The anti-friction sealing device (60) according to the present disclosure preferably comprises at least one and more preferably two soft sealing rings (63, 64). The soft sealing rings can, for example, have the form of an O-ring (FIGS. 1 to 7) or a trapezoidal ring (see FIGS. 10 to 11). They serve, on the one hand, for mounting a hard sealing ring (63, 64) in an associated sealing receptacle (105, 106) of a constructional part (101, 102) and, on the other hand, for static sealing in each case between the constructional part (101, 102) and the hard sealing ring (63, 64).

In the event of relative rotation between the constructional parts (101, 102), one of the hard sealing rings (63, 64) is entrained during the rotary movement of the respective constructional part (101, 102). Thus, there is no or only a very slight relative movement between the respective hard sealing ring (63, 64) and the constructional part (101, 102) in the circumferential direction.

However, the hard sealing rings (63, 64) contact each other circumferentially over the respective contact portions (3), so that a contact area (65) closed by physical contact is formed between the hard sealing rings (63, 64) and furthermore in particular between the contact portions (3).

When the constructional parts (101, 102) are moved, the hard sealing rings (63, 64) thus slide against each other in the circumferential direction and form a sealing barrier in the contact area (65). This barrier separates a first compartment (107) from a second compartment (108), each of which lies adjacent to one another in the radial direction outside and inside the anti-friction sealing device (60). In the example of FIGS. 1 and 2, the first compartment (107) is formed outside the anti-friction sealing device (60) in the radial direction and between the front surfaces of the constructional parts (101, 102) in the axial direction. The first compartment may be identical to the gap (104) or may communicate with the gap (104).

The second compartment (108) is formed in the radial direction within the anti-friction sealing device (60).

At least one of the compartments can preferably receive a sliding and/or cooling medium, for example a gear oil or other conventional lubricant. During a relative movement of the hard sealing rings (63, 64), this lubricant and/or cooling agent is preferably entrained by physical contact and distributed on the contact portions (3) or the anti-friction coatings (8). Alternatively, the anti-friction sealing device can be present as an unlubricated coating.

Various examples of a hard sealing ring (1) are explained below, which can be combined with each other in any way. In particular, two different hard sealing rings (1) or two hard sealing rings (1) of the same type can be combined in an anti-friction sealing device.

Figure 3:
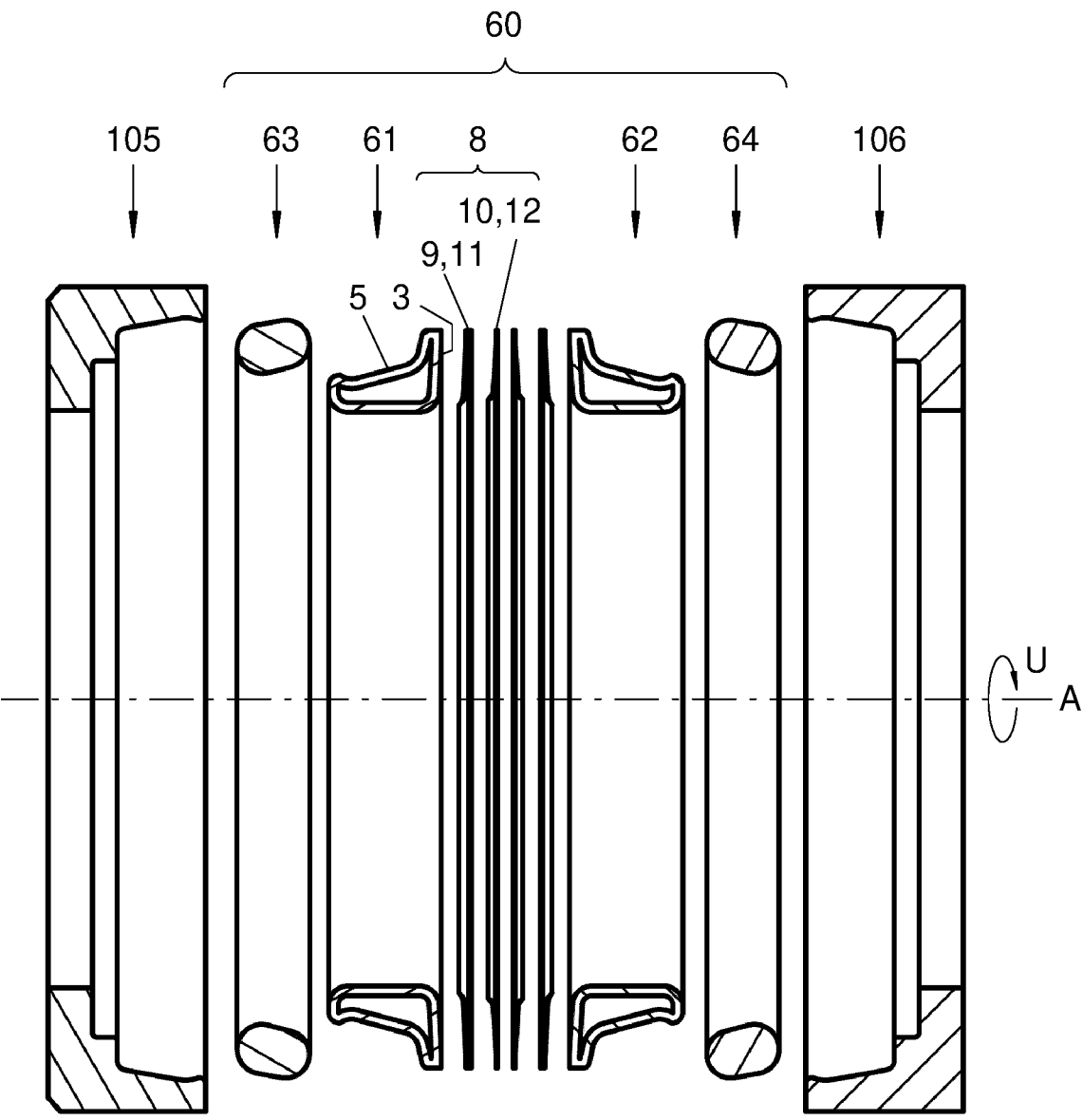
FIG. 3: An anti-friction sealing device according to the present disclosure and an exploded view.

FIG. 3 shows an anti-friction sealing device (60) according to a first example in an exploded view.

In this example, each of the hard sealing rings (1) has a multi-layer anti-friction coating (8). This consists in each case of a first coating layer (9), which is applied directly to the annular body (2, 2') and in particular to the contact portion (3). Furthermore, the anti-friction coating (8) comprises a second coating layer (10), which is applied in superposition to the first coating layer (9). The second coating layer can preferably completely cover the first coating layer in the circumferential direction and/or in the radial direction. Alternatively, only partial coverage can be provided. The anti-friction coating (8) preferably comprises a wear-resistant permanent sliding layer (11), which can also be referred to as a sliding layer. The permanent sliding layer (11) is particularly preferably the first coating layer (9). According to a preferred example, the anti-friction coating (8) and in particular the anti-friction layer (11) has a hardness of at least 400 HV (Vickers hardness), further in particular more than 700 HV or more than 800 HV.

The permanent sliding layer (11) can have any structure and can be produced in any way. It is particularly preferably formed by a metal-matrix composite comprising a binding matrix with embedded hard particles. The embedded hard particles can comprise at least one or more of the following substances:

Carbides, in particular metal carbides, further in particular
chromium carbides;
iron carbides;
tungsten carbides;
titanium carbides;
silicon carbides,
oxides, in particular metal oxides, further in particular
aluminum oxides;
zirconium oxides;
nitrides, in particular metal nitrides, further in particular
boron nitrides.

The binding matrix can preferably be formed from a nickel base and/or a nickel-chromium base and/or a cobalt base and/or an iron base.

According to a further preferred example, which can be combined with the aforementioned features, the permanent sliding layer (11) can contain an additional self-lubricant, which in particular comprises at least one of the following substances or a compound thereof:

Molybdenum;
copper;
Molybdenum sulfide;
bronze;
brass;
graphite;
boron nitrite (especially hexagonal boron nitrite)
PTFE.

A separate running-in layer (12) may preferably comprise graphite or a soft metal such as copper, zinc, tin or aluminum. The soft metal can be contained in pure form or as an alloy. Alternatively or additionally, a running-in layer (12) may comprise graphite or a soft metal such as lead, copper, zinc, tin or aluminum in a metal matrix, for example graphite in a nickel matrix or lead in a nickel matrix.

The running-in layer (12) can be removed locally relatively quickly in the contact area (65) when the anti-friction sealing device is put into operation, so that surface portions running completely flat to one another are formed on the hard sealing rings (61, 62) in contact. By removing the running-in layer, the hard sealing rings (61, 62) can continue to approach each other in the axial direction (A) from a micro perspective, so that the wear-resistant permanent sliding layers (11) behind them gradually come into contact with each other, which have a significantly higher dynamic stability.

Figures 4, 5:
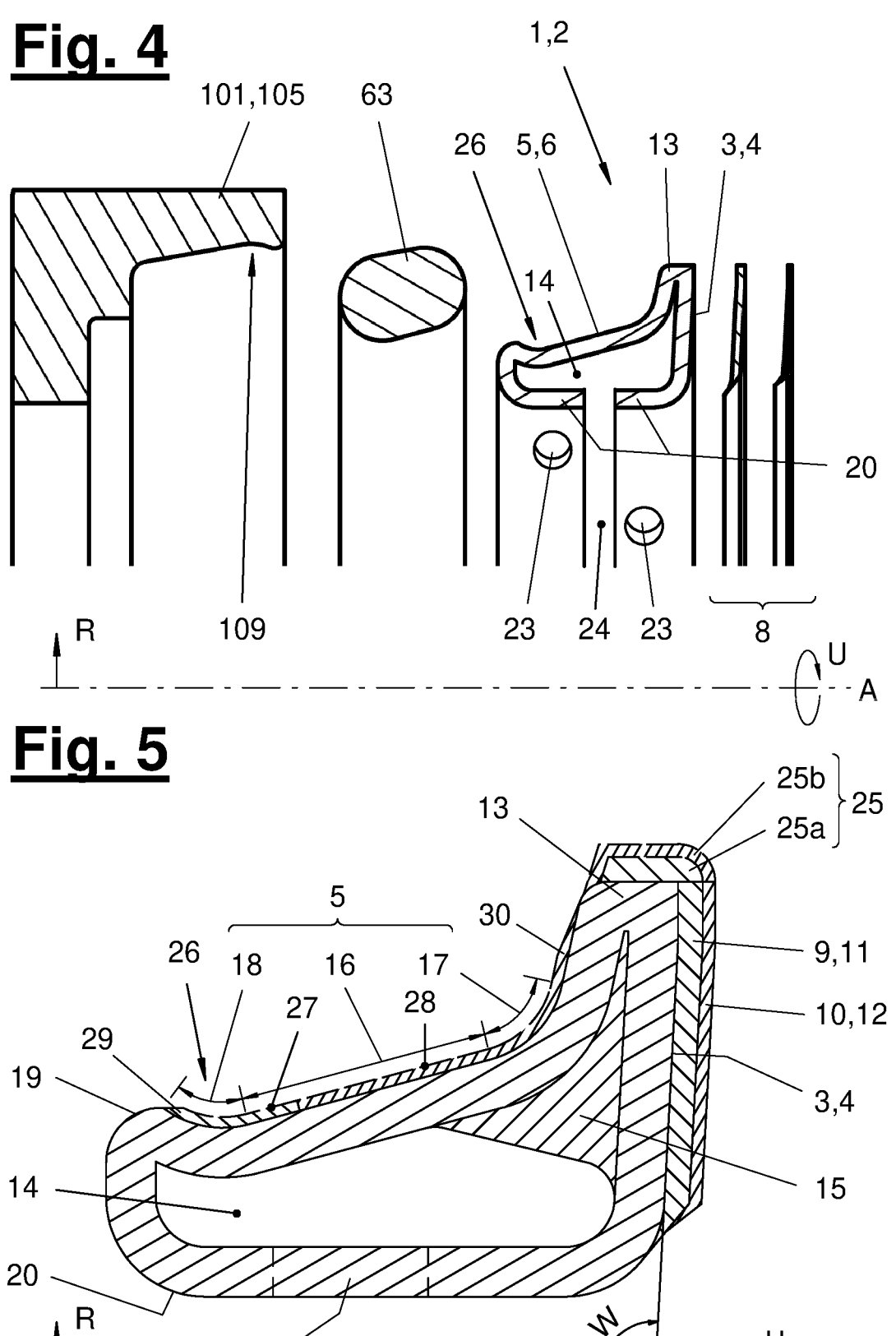
FIG. 4: An enlarged partial view analogous to FIG. 3 in an alternative configuration.
FIG. 5: An enlarged cross sectional view of a hard sealing ring in a first example.
Figure 7:
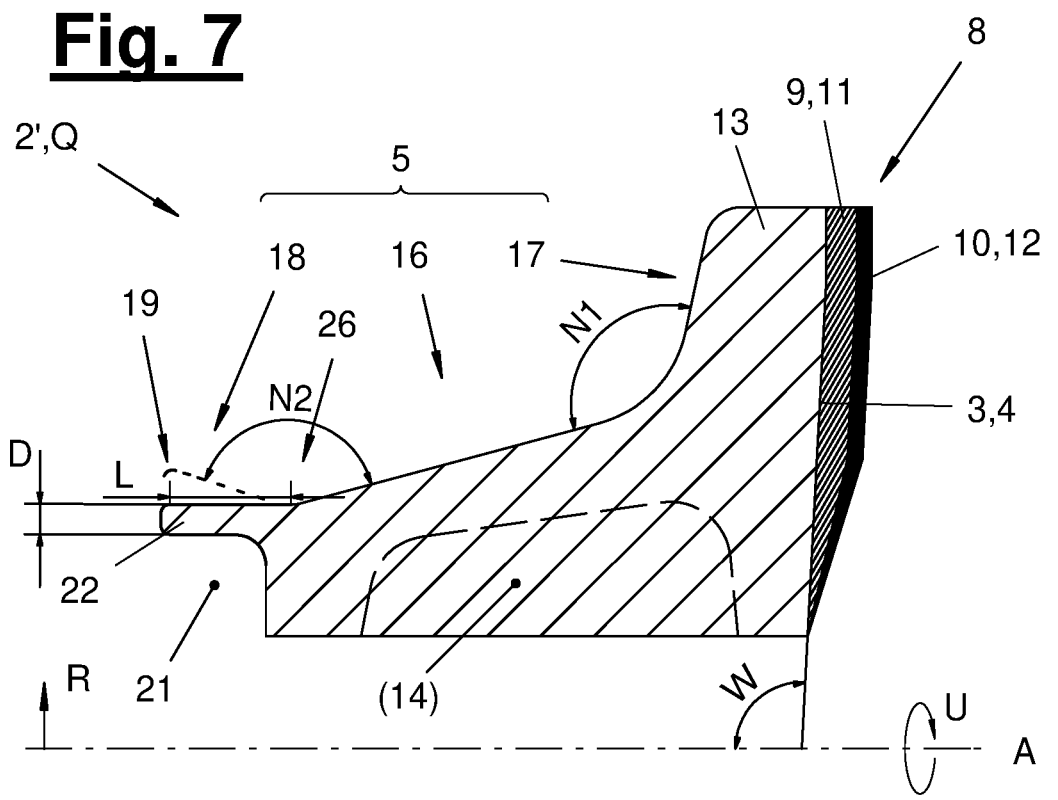
FIG. 7: An enlarged cross-sectional view of a hard sealing ring according to FIG. 6.

According to the exemplary illustration in FIGS. 5 and 7, the contact portion (3) can be inclined in cross section (Q) relative to the axis (A) by an angle (W), wherein this angle (W) is preferably between 80° (angular degree) and 89.5° or wherein the angle (W) is between 90.5° and 100°. In other words, the tilt angle preferably deviates from a right angle by a predetermined minimum amount.

Accordingly, the contact portions (3) preferably oppose each other in the intended mounting position in the contact area (65) as surfaces slightly inclined to each other, between which a small opening angle remains, which is particularly preferably in the range of 0.5 angular degrees to 3 angular degrees. Alternatively, the opening angle can be larger.

The opening angle ensures that, as the service life progresses and the anti-friction coating (8) wears accordingly, the hard sealing rings (61, 62) can move closer and closer along the axis (A) in the micro view, whereby the contact area (65) between the contact portions (3) is shifted inwards or outwards in the radial direction, depending on how the angles (W) are selected. In the example of FIG. 2, the contact area (65) is formed on the outside between contact portions (3) in the radial direction during commissioning and gradually moves inwards in the radial direction. In the example in FIG. 11, the reverse is the case.

In principle, the annular bodies (2, 2') can be formed from any shapeable or primary formable material. They are particularly preferably made of a metal material, more preferably aluminum or an iron material. The choice of material may depend on the intended application. Alternatively or additionally, an annular body (2, 2') can be formed from a plastic. Furthermore, it is possible to manufacture it using a moulding composite-forming process, e.g. to form a fibre composite by lamination.

The annular body (2, 2') preferably has a band collar (13) in the cross section (Q) on the trough portion (5) on the side facing the contact portion (3). The band collar (13) can in particular be an annular band collar, further in particular a radial ring collar. It can be connected to a lateral support area (17) of the trough portion (5) or be present separately. The band collar (13) can preferably serve to leave only a narrow annular gap open in the intended installation position with respect to the associated sealing receptacle (105, 106), so that a transfer of foreign substances from the compartment (107) in the direction of the trough portion (5) and the soft sealing ring (63, 64) preferably arranged there is prevented or restricted.

The trough portion (5) of the annular body (2, 2') preferably has a central region (16) with a contour that is flat in cross section (Q), the central region (16) forming a seating surface for receiving a soft sealing ring (63, 64). The central region (16) can have an inclined position relative to the axial direction (A). The inclination of the central region (16) relative to the axis (A) may in particular be between 1° (angular degree) and 30°, or possibly larger. Alternatively, the central region (16) can be aligned parallel to the axis (A).

Figure 9:
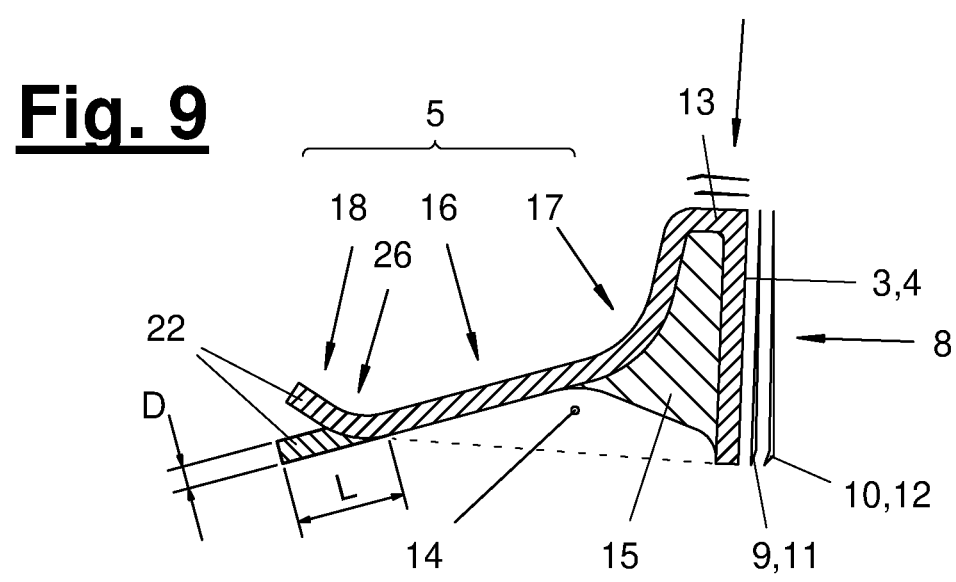
FIG. 9: A cross-sectional view of a further example of a hard sealing ring.

Furthermore, the trough portion (5) preferably has a (the) central region (16) in cross section and at least one directly adjacent lateral support area (17, 18). FIGS. 5, 7 and 9 show further details of the shape of the trough portion.

The trough portion (5) can have a (first) lateral support area (17), which is located in the direction of the axis (A) on the side of the central region (16) facing the contact portion (3). The trough portion (5) can alternatively or additionally have a (second) lateral support area (18), which is located in the direction of the axis (A) on the side of the central region (16) remote from the contact portion (3).

The one or the two lateral support areas (17, 18) limit a range of movement of the soft sealing ring (63, 64) or form a contact surface via which bearing forces in the direction of the bearing forces in the direction of the axis (A) between the constructional part (101, 102) or the sealing receptacle (105, 106) and the hard sealing ring (61, 62) can be transmitted or supported by means of the soft sealing ring (63, 64).

Accordingly, the at least one lateral support area (17,18) is preferably inclined relative to the central region (16), in particular at an obtuse tilt angle (N1,N2). Alternatively, a different amount of the tilt angle (N1, N2) may be present, in particular a right angle.

The strength of the inclination (N1, N2) and a longitudinal extension (L) of the second lateral support area (18), which is located in the direction of the axis (A) on the side of the central region (16) remote from the contact portion (3), have a considerable influence on the range of variants of the soft sealing rings (63,64) that can be used with a respective hard sealing ring (61,62). On the other hand, the choice of soft sealing ring (63,64) often depends on the operating conditions and the available installation space. It is therefore advantageous to make the trough portion (5) adaptable at least in the area of the (second) lateral support area, in which a change in shape is permitted. The change in shape can be created in particular by the (second) lateral support area (18) being formed by a collar (22) (see FIGS. 6 to 9). This collar (22) can preferably have a longitudinal extension (L) in the cross section (Q) which is greater by a factor x than its thickness (D), i.e. with L=x*D. The factor x is at least 1.5 and further preferably between 2 and 4. In particular, it may be provided that a hard sealing ring is adapted for a specific application by (re-)shaping the collar (22). Particularly preferably, the (second) lateral support area (18) for an intended assembly position can be additionally bent or flanged compared to the initial shape, so that its longitudinal extension (L) in cross section (Q) is more inclined towards the trough portion (5) (than was the case in the initial position). In the example of FIG. 9, an annular body (2) is formed by shaping, in particular by a process for roll stamping a semifinished product (40), which will be discussed in more detail below. Here, the (second) lateral support area (18) is formed in an initial shape as an axial collar (22), the longitudinal extension (L) of which extends in cross section (Q) in the direction of the axis (A) or is oriented collinearly to the extension of the central region (16). From this initial shape, the collar (22) can be reshaped by a further shaping step into the position that is also shown in FIG. 9, which is more inclined towards the trough portion (5).

In the example shown in FIG. 7, an annular body (2') is shown which is formed by primary forming, in particular by casting a metal material, in particular by aluminum die casting. The annular body (2') here has an undercut (21) on the side of the (second) lateral support area (18) pointing away from the trough portion (5), so that a collar (22), in particular an axial collar (22) with a thin-walled hollow-cylindrical basic shape, also remains. The longitudinal extension (L) of this axial collar (22) is preferably oriented parallel to the axis (A). This has the particular advantage that the negative mold for primary forming of the annular body can have a particularly simple design and can be formed in the direction of the axis (A). This massively reduces tooling costs.

A rounded slide-on surface (19) can preferably be provided on the (second) lateral support area (18), so that the soft sealing ring (63, 64) can be pushed on without damage.

The transition between the central region (16) and the at least one lateral support area (17, 18) can have any desired shape. For example, it is advantageous for the use of soft sealing rings (63, 64) with a round cross section shape, in particular for the use of O-rings, if there is a rounded transition in the cross section (Q) between the central region (16) and the at least one lateral support area (17, 18). This shape is shown in various configurations in the figures. Alternatively, there may be an angular or stepped transition (not shown).

The position, radius and arc length of the rounded transition can preferably be adjustable. If the annular body (2) as a whole is manufactured by shaping, the setting can be adjusted in particular during the manufacturing process by the formation or also the position and in particular the relative position of the manufacturing means, in particular the embossing rollers or the flanging tool. If the annular body (2') is manufactured by primary forming, the adjustability may only be possible for the (second) lateral support area (18) on the side facing away from the contact portion (3).

A hard sealing device according to the present disclosure may preferably comprise an annular body (2, 2') having a cavity (14) in the cross section (Q). The cavity (14) can have any shape and position. It is preferably formed as a semi-open cavity or semi-cavity arranged predominantly or completely in the cross section of the annular body, which on the one hand faces away from the contact portion (3) and on the other hand faces away from the trough portion (5). In other words, the annular body (2, 2') preferably has a cavity (14) in the cross section (Q), which is located on the one hand adjacent to the contact portion (3) and on the other hand adjacent to the trough portion (5) and is separated from each of these by a part of the wall of the annular body (2, 2').

The cavity (14) can remain free in the intended mounting position or be partially or completely filled by a filler (15). The filler (15) can be formed from any material and have any shape. It can serve one or more purposes, for example stiffening, increasing thermal conductivity or supporting the supply or removal of a lubricant and/or coolant. The increase in thermal conductivity and/or the supply or removal of the lubricant and/or coolant can in particular be used advantageously to dissipate the thermal energy that is generated during operation, in particular in the contact area (65), and is to be dissipated via the adjacent wall areas of the annular body (2, 2').

The cavity (14) can be formed independently of the manufacturing method of the annular body (2, 2'). Its shape can be adapted to the respective application.

FIGS. 1 to 5 and 10 to 12 show examples in which a cavity (14) is partially or completely enclosed in cross section (Q) by the annular body (2, 2'). FIGS. 7 and 9 show examples in which a cavity (14) is provided as a semi-cavity which is only partially enclosed by the annular body (2, 2').

Figure 14A:
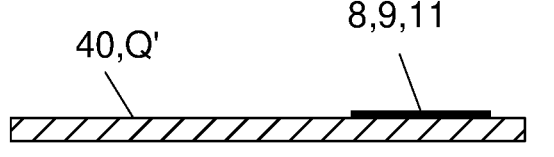
FIGS. 14*a*-14*c*: Cross-sectional views of various semi-finished products.
Figure 14B:
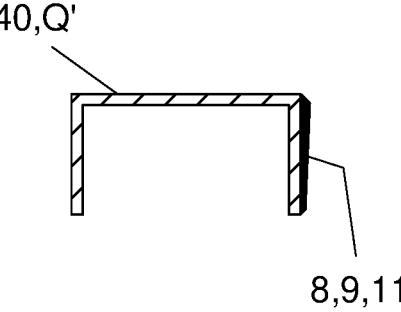
Figure 14C:
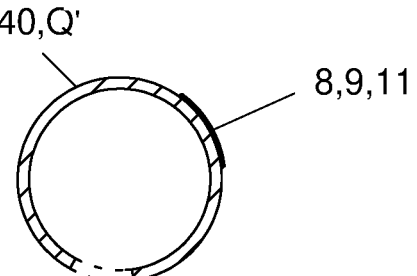

In the example of FIG. 5, an annular body (2) is shown which is formed by shaping from a semifinished product (40) which was previously a flat material with a rounded or annular cross section (Q') and a cavity (see FIG. 14C).

The cavity (14) here extends deep into a kink formed in the region of an annular band collar (13) between the contact portion (3) and the trough portion (5). Here, a filler (15) is inserted into the cavity (14), which is formed, for example, by a highly thermally conductive metal such as copper or tin. The filler (15) can be produced by centrifugal hot soldering, for example. On the one hand, it serves to provide mechanical support between the contact portion (3) and the trough portion (5) and, on the other hand, can significantly promote heat dissipation, which in turn leads to considerable advantages in terms of service life.

A protective coating (25) is provided on the band collar (13) as an optional feature. The protective coating (25) can be single or multi-layered. In the example shown, the protective coating has two layers and comprises a first (inner) layer (25*a*). This can preferably consist of a hard and wear-resistant material. In particular, the first layer (25*a*) can consist of the same material as the first coating layer (9) on the contact portion (3). In the example shown, the protective coating (25) further comprises a second (outer) layer (25*b*). This second layer (25*b*) can preferably consist of a different material than the first layer (25*a*), in particular of a comparatively softer material. Furthermore, the second layer (25*b*) may have certain supplementary material properties, such as increased corrosion resistance compared to the first layer (25*a*) or compared to the base material of the annular body (2, 2'), or increased resistance to certain expected foreign substances such as acids or alkalis. The second layer (25*b*) may consist of the same material as the second coating layer (10) on the contact portion (3).

In a preferred example, the anti-friction coating (8) on the contact portion (3) and the protective coating (25) on the band collar (13) have a material and layer composition of the same type.

The protective coating (25) and the anti-friction coating (8) can each be applied separately or in a common step. They can also be clearly physically separated from one another or merge into one another. This may apply selectively to only some of the layers (25*a*, 25*b*) of the protective coating or to only some of the layers (9, 10, 11, 12) of the anti-friction coating.

In the example shown in FIG. 5, the protective coating (25) on the band collar (13) and the anti-friction coating (8) on the contact portion (3) merge into one another in the region of an intermediate circumferential edge of the annular body (2, 2'). In another example, shown in FIG. 9 or FIG. 12, the protective coating (25) on the band collar (13) and the anti-friction coating (8) on the contact portion (3) are present separately, with no direct material transition between them.

Figure 12:
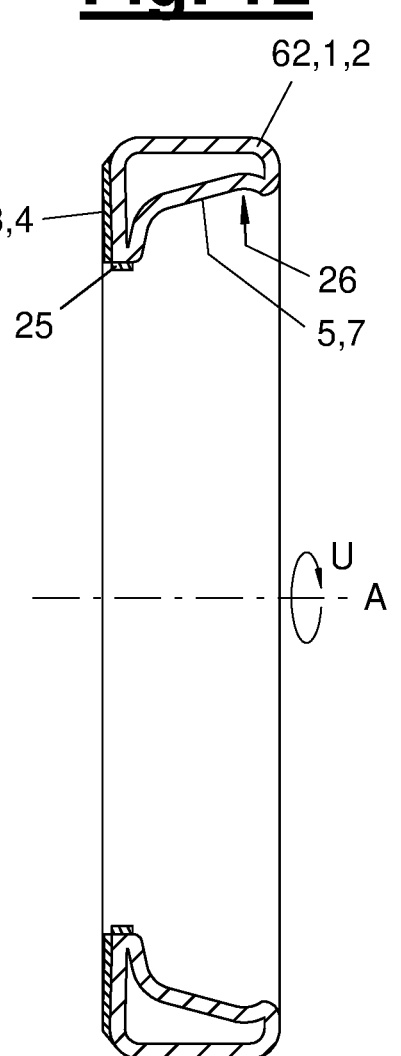
FIG. 12: A cross-sectional representation of a hard sealing ring according to FIG. 10 in individual representation.

According to an alternative example, the protective coating (25) can be arranged on another radial surface portion of the annular body (2, 2'), this radial surface portion being located between the trough portion (5) on the one hand and the contact portion (3) on the other hand. The radial surface portion can face the outside of the annular body (2, 2'), as shown in FIGS. 5 and 9, or also face the inside of the annular body (2, 2'), as shown in FIG. 12.

The cross-sectional view according to FIG. 5 shows another preferred design of the hard sealing ring. Here, on the radial lateral surface of the annular body (2, 2'), more precisely in the area of the trough portion (5), surface portions (27, 28) adjacent to one another in the axial direction (A) are provided with a different adhesion-promoting effect. In particular, a (first) surface portion (27) limited in the axial direction (A) can be provided on the trough portion (5), which covers only a part of the trough portion (5), this surface portion (27) having an increased adhesion-promoting effect with respect to a soft sealing ring (63, 64) that can be placed there. A surface portion (27) with an increased adhesion-promoting effect can be provided in any desired manner, in particular by the presence of an adhesion-promoting supplementary material (29) and/or by the presence of an adhesion-promoting surface structure. Furthermore, a (second) surface portion (28) limited in the axial direction (A) may be provided on the trough portion (5), which has other surface properties. In particular, this further surface portion (28) can have an increased sealing-promoting effect compared to a soft sealing ring. The increased sealing-promoting effect can also be provided in any desired manner, in particular by the presence of a sealing-promoting supplementary material (30) and/or by the presence of a sealing-promoting surface structure.

Figure 15:
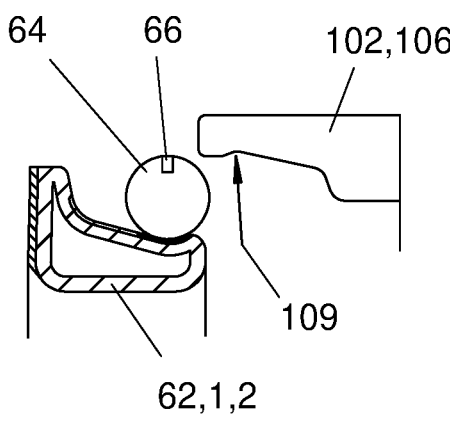
FIGS. 15 and 16: Cross-sectional views of a hard sealing ring and a soft sealing ring in different states when inserted into a constructional part.
Figure 15:
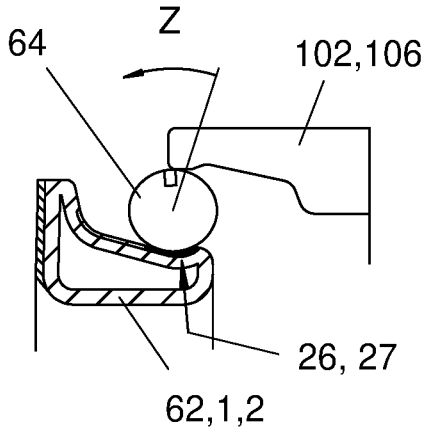
Figure 16:
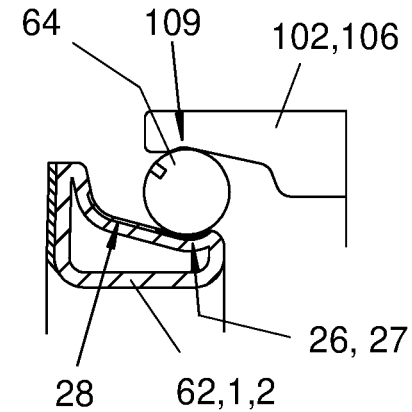
Figure 16:
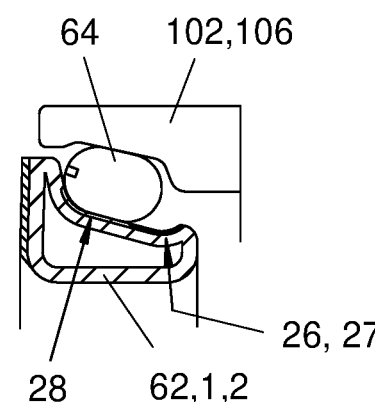

FIGS. 15 and 16 explain a procedure for inserting a hard sealing ring (62) with a soft sealing ring (64) attached to the trough portion (5) into a sealing receptacle (106) on a housing (102). A peripheral channel (26) can preferably be provided on the trough portion (5) of the hard sealing ring (62), which is shown in enlarged form in FIG. 5, The peripheral channel (26) can have any desired design. It can particularly preferably be arranged between, on the one hand, the central region (16) of the trough portion (5) and, on the other hand, a lateral support area (18) which is remote from the contact portion (3). Further, the central region (16) and/or the lateral support area (18) can be inclined with respect to the axial direction (A). At the peripheral channel (26), a local extremum of the diameter of the circumferential surface is present in the cross section (Q) along the axis (A). As a result, a soft sealing ring, which is placed on the hard sealing ring (2, 2', 62) with slight stretching relative to its basic shape, can be pushed into a preferred position along the peripheral channel (26) in accordance with its elastic deformation. In the examples according to FIGS. 5, 7, 9 and 15, the peripheral channel (26) is formed on a radial outer surface of the annular body by a local minimum of the diameter of the circumferential surface. In the example of FIG. 12, a peripheral channel (26) is formed on a radial inner surface of the annular body by a local maximum of the diameter of the circumferential surface.

In a pre-assembly step, the soft sealing ring (64) can be fitted to the trough portion (5) and in particular along the peripheral channel (26) in such a way that it is free from twisting. In order to support the twist-free placement and a quick position check, the soft sealing ring may have a circumferential-line marking (66), which is recognizable as a circular line on the outer surface, in particular in an undeformed state of the soft sealing ring. In FIG. 15, the circumferential-line marking (66) is arranged on the radial outer surface of the soft sealing ring (64) and marks the maximum circumference of the sealing ring.

In the pre-assembly position shown, the course of the circumferential-line marking (66) makes it possible to determine at first glance whether (or not) the soft sealing ring is seated on the hard sealing ring without twisting. If this is the case, the hard sealing ring can be inserted into the constructional part (102) according to the transition from the left-hand representation to the right-hand representation of FIG. 15. During this insertion, there should be a rolling movement in which the soft sealing ring rolls without slippage on the surface of the trough portion (5) on the one hand and on the surface of the sealing receptacle (106) on the constructional part (102) on the other hand, so that the sealing ring describes the same rolling angle (Z) at every point along its circumference.

The design of the trough portion (5) described above, with surface portions (27, 28) adjacent to each other in the axial direction (A) and having a different adhesion effect, favors this uniform rolling movement.

Figure 6:
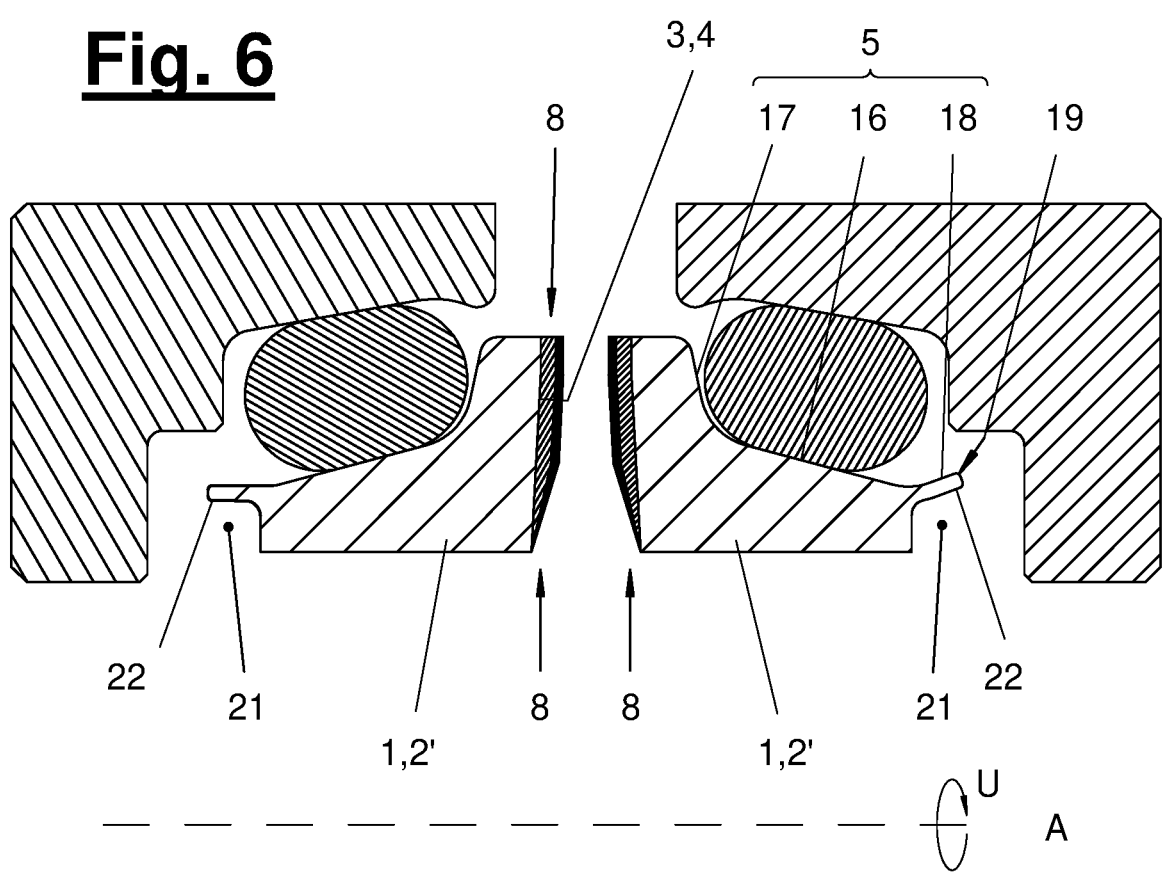
FIG. 6: A second example of an anti-friction sealing device with a further design of the hard sealing rings.

FIG. 16 illustrates a further movement of the soft sealing ring (64) that can occur when the sealing pairing is produced according to the (intended) end position shown in FIG. 6. Here, the hard sealing ring (62) is pushed even further in the axial direction (A) into the sealing receptacle (106) on the constructional part (102). Here, likewise, the soft sealing ring (64) should describe a rolling movement, whereby the soft sealing ring (64) again rolls on the surface of the trough portion (5) on the one hand and on the surface of the sealing receptacle (106) on the constructional part (102) on the other hand without slippage. This is shown in the transition from the left-hand illustration to the right-hand illustration in FIG. 16. During this rolling movement, the soft sealing ring (64) may also be elastically compressed. The effort of the soft sealing ring (64) to return to its original body shape causes an elastic bearing force between the hard sealing ring (62) on the one hand and the sealing receptacle (106) on the constructional part (102) on the other. The more uniform the formation of the rolling angle (Z) along the circumferential direction of the soft sealing ring (64) can be achieved, the more uniform the bearing forces for the hard sealing ring (62) are formed, which in turn favors a uniform and thus durable contact in the area of the sliding surface (9) on the contact portion (2).

During the rolling movement shown in FIG. 16, the soft sealing ring (64) can be displaced relative to the trough portion (5) along its central region (16). As a result of this displacement, the predominant physical contact between the soft sealing ring (64) and the hard sealing ring (62) is no longer at the surface portion (27) with the increased adhesion mediation effect, but at a surface portion (28) adjacent thereto, at which there is preferably an increased sealing-promoting effect.

The above-mentioned designs of the soft sealing ring (64) and the hard sealing ring (62) each individually or in combination favor twist-free pre-assembly and final assembly of the soft sealing ring. Furthermore, the circumferential-line marking (66) on the soft sealing ring (64) allows the twist-free condition of the soft sealing ring (64) and the resulting correct positioning of the hard sealing ring (62) to be checked with the naked eye or by simple optical means both in the pre-assembly state as shown in FIG. 15 and during final assembly/production of the sealing pairing as shown in FIG. 16. In this way, incorrect assembly and the resulting impairment of the service life can be effectively reduced or completely eliminated.

The annular body (2, 2') can have one or more openings (23, 24) along the circumferential direction (U). The openings (23, 24) can be made separately or result from the production method or the original shape of the semifinished product (40).

FIG. 4 shows an example of a continuous slot-shaped opening (24) in the circumferential direction (U) as well as various local openings (23) which penetrate the wall of the annular body (2, 2') and preferably open into the cavity (14). The openings (23, 24) are preferably arranged outside the contact portion (3) and outside the trough portion (5). On the one hand, they can serve to create an access for the insertion of a filler (15). On the other hand, they can contribute to promoting the supply or removal of a lubricant and/or coolant and, in particular, generate a pumping effect during a relative movement of the hard sealing rings (61, 62).

Figure 8:
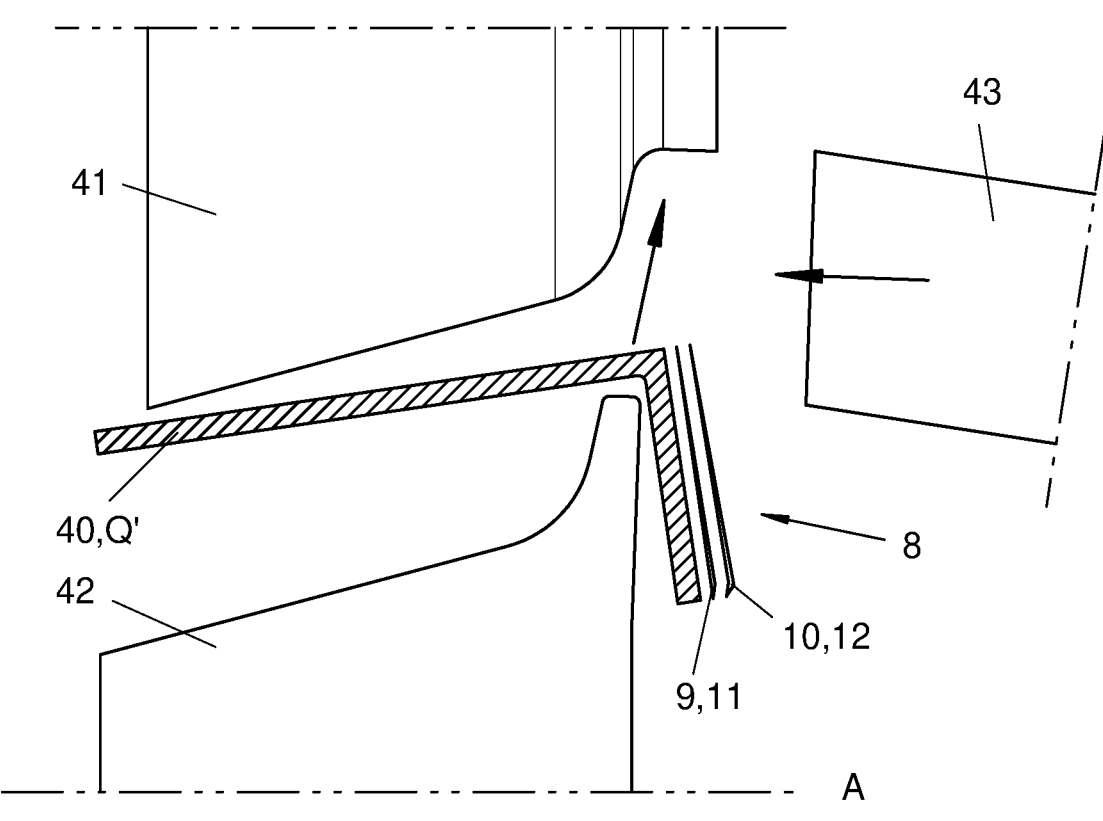
FIG. 8: A schematic representation of a production method according to the present disclosure.
Figure 13:
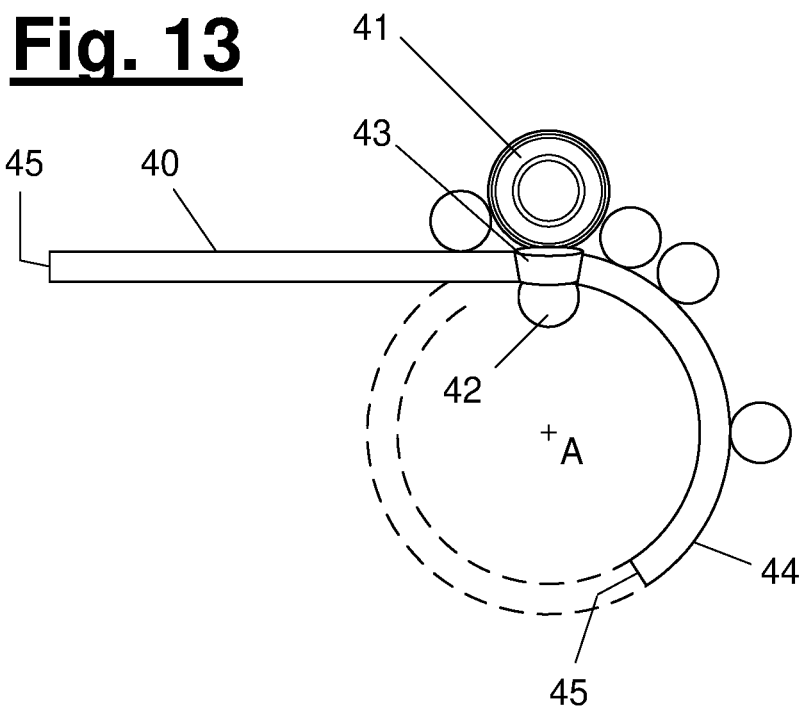
FIG. 13: A schematic representation of a production method according to the present disclosure.

FIGS. 8 and 13 schematically explain a method for manufacturing a hard sealing ring according to the present disclosure. It comprises the steps of providing a semifinished product (40) with an elongated extension; shaping, in particular roll-forming, further in particular roll-stamping the semifinished product (40) and forming a preliminary product (44) with an open annular shape; and joining the ends (45) of the preliminary product (44) to form an annular body (2) with a rotationally symmetrical basic shape with respect to an axis (A) and with a closed circumference (U).

Shaping and in particular roll-forming or roll-stamping can be carried out particularly preferably by an arrangement of rollers (41, 42, 43), in particular embossing rollers or stamping rollers. At least some of the rollers (41, 42) preferably have a profiling such that part of the cross-sectional profiling of the annular body (2) is produced in the course of the forming process. One or more further rollers (43) can be provided in order to additionally guide the semifinished product or the preliminary product and/or to bring about a supplementary adaptation to the profiled rollers. In the example of FIG. 8, an upper roller (41) and a lower roller (42) are provided with such a shaping that the cross-sectional profile of a trough portion (5) with a central region (16) and a first lateral support area (17) is predetermined between them, as well as a transition to an annular band collar (13). A further embossing roller (43), which can be adjusted from the side, serves to align a body region of the semifinished product (40), which forms the contact section (3) on the (later) annular body (2), and in particular to adjust the tilt angle (W) relative to the axis (A).

At least a first coating layer (9) for an anti-friction coating (8) can already be provided on this body region before shaping, i.e. on the semifinished product (40). In this way, semifinished products prepared as bar stock with an anti-friction coating (8) already applied can be used, which results in considerable cost savings. The joining of the ends (45) of the preliminary product (44) can be carried out in any desired manner, for example by laser welding and furthermore by introducing the welding energy from a side facing away from the contact portion (3) on the one hand and/or from the trough portion (5) on the other hand. In other words, the welding energy is introduced into the material of the annular body (2) from a side with a half-open cavity (14), so that the anti-friction coating (8) already applied is impaired as little as possible. In this way, a particularly high degree of coplanarity can be achieved between the abutting end regions of the local contact portions (3) at the ends (45) of the preliminary product (44) to be joined. Alternatively, the welding energy can be introduced from another side, in particular from the side facing away from the cavity (14) in the radial direction.

Coplanarity can also be increased by applying a further coating layer (10) over the first coating layer (9) after the ends (45) have been joined. This further coating layer (10) can in particular be a running-in layer (12). Alternatively or additionally, a wear-resistant permanent sliding layer (11) or an additional sliding layer (11) can be applied. In other words, the further coating layer (10, 11) is applied to the annular body (2) with a closed circumference (U).

The at least one coating layer (9, 10) of the anti-friction coating (8) can be applied in any desired manner. At least one of the following methods may be particularly preferred:

Thermal spraying, in particular
  high-velocity oxy-fuel spraying;
  Arc wire spraying;
  plasma spraying;
laser alloying;
Built-up welding, in particular by laser or electric arc;
vapour phase deposition, in particular
  physical vapor deposition;
  chemical vapor deposition Any semifinished product (40) can be used for the production method by shaping. This can, for example, be a flat material as shown in FIG. 14A, in particular a flat metal strip or sheet metal strip.

Alternatively, the semifinished product (40) can be a pre-profiled material, in particular a flat material pre-profiled in cross section (Q') (see FIG. 7).

Again alternatively, the semifinished product (40) can be a flat material angled in cross section (Q'), in particular an angled metal or sheet metal profile, further in particular an L-profile or U-profile (cf. FIG. 14B).

Again alternatively, the semifinished product (40) can be a flat material with a rounded or annular cross section (Q') and a hollow space, in particular a tubular profile with a closed or open circumference (cf. FIG. 14C, FIGS. 1 to 5), further in particular a round tubular profile or a rectangular tubular profile.

Variations of the present disclosure are possible in various ways. In particular, all features, aspects and examples shown, described or claimed in the context of the present disclosure can be combined with or substituted for one another in any desired manner.

Alternatively or in addition to the method steps explained above, it may be provided that at least one of the coating layers (9, 10) is applied by means of the following steps:

Local heating of the material surface of the contact portion (3) until the melting temperature is exceeded; Alloying of graphite; Cooling, in particular shock cooling of the material surface of the contact portion (3) below the austenitizing temperature.

The annular body according to the present disclosure may be formed by any production method. Alternatively or in addition to the specifically described methods for shaping and primary forming, at least one of the following methods may also be used to produce the annular body and/or the filler and/or the anti-friction coating:

Mold-less primary forming with additive material application, in particular 3D printing by applying a material that is present as a powder, filament or liquid material;
Mold-less primary forming with additive material application, in particular 3D printing by selective laser melting (SLS) or multi-jet fusion (MJF); and
Mold-bound primary forming, in particular by drop forging, hard casting, centrifugal casting, gravity casting, precision casting, sintering.

LIST OF REFERENCES

1 Hard sealing ring/sliding hard sealing ring
2 Annular body
2' Annular body
3 Contact portion
4 Front surface
5 Trough portion
6 Radial lateral surface (towards the outside)
7 Radial lateral surface (towards the center)
8 Anti-friction coating
9 First coating layer
10 Second coating layer
11 Sliding layer
12 Running-in layer
13 Band collar/annular band collar/radial annular band collar
14 Cavity
15 Filler
16 Central region/seating surface
17 First lateral support area
18 Second lateral support area
19 Slide-on surface
20 Rear wall
21 Undercut
22 Collar/axial collar
23 Opening (local)
24 Opening (circumferential)
25 Protective coating
25a Protective coating, first layer
25b Protective coating, second layer
26 Peripheral channel
27 Surface portion/adhesion-promoting portion
28 Surface portion/sealing-promoting portion
29 Supplementary material, adhesion-promoting
30 Supplementary material, sealing-promoting
40 Semifinished product
41 Roller/embossing roller
42 Roller/embossing roller
43 Roller/embossing roller
44 Preliminary product
45 End/end front surface
60 Anti-friction sealing device
61 First hard sealing ring
62 Second hard sealing ring
63 First soft sealing ring
64 Second soft sealing ring
65 Contact area
66 Circumferential-line marking
100 Assembly group
101 First constructional part/component
102 Second constructional part/component
103 Rotational bearing
104 Gap
105 Sealing receptacle
106 Sealing receptacle
107 First compartment
108 Second compartment
109 Peripheral channel
A Axis/axial direction
D Thickness (material thickness at the lateral support area)
L Longitudinal extension (length of lateral support area)
N1 Tilt angle
N2 Tilt angle
Q Cross section of annular body, position in the direction of axis A
Q' Cross section of semifinished product
R Radial direction
W Angle (between contact portion/front surface and axis)
Z Rolling angle of the soft sealing ring when inserted into the sealing receptacle

The invention claimed is:

1. A hard sealing ring, comprising an annular body which has a rotationally symmetrical basic shape with respect to an axis, wherein the annular body has, in a cross section which lies in a direction of the axis, a contact portion which is arranged on an end face of the annular body, the contact portion pointing outwards in the direction of the axis, and wherein the annular body has a trough portion in the cross section, which is arranged on a radial lateral surface of the annular body and faces away from the contact portion with respect to the direction of the axis, wherein the annular body has an anti-friction coating on the contact portion, characterized in that the annular body is produced by shaping from a cut-to-length starting material which is bent into an annular shape and joined at the ends, wherein the annular body has a band collar in the cross section at the trough portion towards a side of the contact portion, wherein a protective coating is provided on the annular body in a radial surface portion which lies between, on the one hand, the trough portion and, on the other hand, the contact portion, in particular on a radial circumferential surface of the band collar.

2. The hard sealing ring according to claim 1, wherein on the radial lateral surface of the annular body, in particular in a region of the trough portion, there are surface portions which are adjacent to one another in the direction of the axis and have a different adhesion-promoting effect.

3. The hard sealing ring according to claim 1, wherein a surface portion which is limited in the direction of the axis is provided on the trough portion and covers only a part of the trough portion, wherein the surface portion has an increased adhesion-promoting effect compared with a soft sealing ring which can be placed there, in particular due to a presence of an adhesion-promoting supplementary material and/or due to the presence of an adhesion-promoting surface structure.

4. The hard sealing ring according to claim 1, wherein the anti-friction coating has at least one graded coating layer with an inhomogeneous material structure.

5. The hard sealing ring according to claim 1, wherein the annular body is formed from a metal material; AND/OR of a plastic material.

6. The hard sealing ring according to claim 1, wherein the annular body is formed from a composite material, in particular comprising a fiber composite, further in particular by a molding composite-forming process.

7. The hard sealing ring according to claim 1, wherein the anti-friction coating is formed in multiple layers and in particular comprises two or more coating layers which are superimposed in the direction of the axis.

8. The hard sealing ring according to claim 1, wherein the anti-friction coating comprises a wear-resistant permanent sliding layer.

9. The hard sealing ring according to claim 1, wherein the anti-friction coating has a hardness of at least 400 HV (Vickers hardness), in particular more than 600 HV.

10. The hard sealing ring according to claim 1, wherein a permanent sliding layer is formed by a metal-matrix composite comprising a binding matrix with embedded hard particles.

11. The hard sealing ring according to claim 10, wherein the embedded hard particles comprise one or more of the following:

Carbides, in particular metal carbides, further in particular

Chromium carbides;

iron carbides;

Tungsten carbides;

Titanium carbides; and

Silicon carbides;

Oxides, in particular metal oxides, further in particular

Aluminum oxides; and

Zirconium oxides; and

Nitrides, in particular metal nitrides, further in particular

Boron nitrides.

12. The hard sealing ring according to claim 10, wherein a binding matrix is formed from a nickel base;

a nickel-chromium base;

a cobalt base; or an iron base.

13. The hard sealing ring according to claim 1, wherein a permanent sliding layer includes an additional self-lubricant, in particular comprising at least one of the following substances or a compound thereof:

Molybdenum;

copper;

boron;

molybdenum sulphide;

bronze;

brass;

graphite;

boron nitrite (especially hexagonal boron nitrite); and

PTFE.

14. The hard sealing ring according to claim 1, wherein the anti-friction coating comprises a separate running-in layer.

15. The hard sealing ring according to claim 14, wherein the running-in layer comprises graphite or a soft metal such as lead, copper, zinc, tin or aluminum in pure form or as an alloy; AND/OR graphite or a soft metal such as lead, copper, zinc, tin or aluminum in a metal matrix.

16. The hard sealing ring according to claim 1, wherein the contact portion is inclined in the cross section with respect to the axis by an angle, wherein the angle is between 80° (angular degree) and 89.5° OR wherein the angle is between 90.5° and 100°.

17. The hard sealing ring according to claim 1, wherein the trough portion comprises a central region having a contour which is flat in the cross section and which forms a seating surface for receiving a soft sealing ring.

18. The hard sealing ring according to claim 17, wherein the central region is inclined with respect to the direction of the axis.

19. The hard sealing ring according to claim 1, wherein the trough portion comprises in the cross section a central region and at least one directly adjacent lateral support area.

20. The hard sealing ring according to claim 19, wherein the trough portion has a first lateral support area, wherein the first lateral support area is located in the direction of the axis on a side of the central region facing the contact portion.

21. The hard sealing ring according to claim 20, wherein the trough portion comprises a second lateral support area, wherein the second lateral support area is located in the direction of the axis on the side of the central region remote from the contact portion.

22. The hard sealing ring according to claim 19, wherein the at least one directly adjacent lateral support area is inclined with respect to the central region, in particular at an obtuse tilt angle, and wherein the at least one directly adjacent lateral support area is in particular further inclined with respect to the direction of the axis.

23. The hard sealing ring according to claim 19, wherein a peripheral channel is formed between a lateral support area and the central region of the trough portion, at which peripheral channel a local extremum of a diameter of a circumferential surface is present in the direction of the axis.

24. The hard sealing ring according to claim 19, wherein there is a rounded transition in the cross section between the central region and the at least one directly adjacent lateral support area.

25. The hard sealing ring according to claim 21, wherein a second lateral support area is formed by a collar whose longitudinal extension in the cross section is greater by a factor x than its thickness, wherein x is at least 1.5 and preferably between 2 and 4.

26. The hard sealing ring according to claim 25, wherein the annular body is formed at least in part by shaping, in particular by roller stamping of a rod-shaped semifinished product, and wherein the second lateral support area is formed in the initial shape as an axial collar, the longitudinal extension of which is oriented in the cross section in the direction of the axis or collinear to an extension of a central region.

27. The hard sealing ring according to claim 25, wherein the second lateral support area is additionally bent or flanged with respect to the initial shape for an intended mounting position, so that its longitudinal extension in the cross section is inclined towards the trough portion.

28. The hard sealing ring according to claim 1, wherein a filler (15) is arranged in a cavity (14), wherein the filler (14) is in particular
  a separate body made of a base material of the annular body; AND/OR
  comprises a material other than the base material of the annular body, in particular a material with a lower surface hardness and/or a material with a higher thermal conductivity, and/or a material that locally changes a stiffness; AND/OR
  comprises a 3D support contour, in particular formed by an unmolded manufacturing process or by an additive manufacturing process; AND/OR
  comprises an active body, in particular a sensor or an actuator.

29. The hard sealing ring according to claim 1, wherein a cavity (12) is partially or completely enclosed in the cross section by the annular body.

30. The hard sealing ring according to claim 1, wherein the annular body has one or more openings along a circumferential direction, which open to a cavity.

31. The hard sealing ring according to claim 1, wherein a soft sealing ring is arranged on the trough portion of the hard sealing ring, which soft sealing ring assumes a preferred position along a peripheral channel, in particular by elastic counter-deformation.

32. An anti-friction sealing device comprising at least a first hard sealing ring and a second hard sealing ring, which each have a contact portion, the hard sealing rings being arranged adjacent to one another and coaxially to one another in an intended mounting position along an axis, so that the contact portions contact one another circumferentially, characterized in that at least one of the hard sealing rings (61, 62) is designed according to claim 1.

33. The anti-friction sealing device according to claim 32, wherein the anti-friction sealing device further comprises at least one soft sealing ring.

34. The anti-friction sealing device according to claim 33, wherein the soft sealing ring has a circumferential-line marking which is recognizable as a circular line on an outer surface, in particular in an undeformed state of the soft sealing ring.

35. A hard sealing ring, comprising an annular body has a rotationally symmetrical basic shape with respect to an axis, wherein
  the annular body has, in a cross section which lies in the direction of the axis, a contact portion which is arranged on an end face of the annular body, wherein the contact portion points outwards in the direction of the axis, and wherein
  the annular body has a trough portion in cross section, which is arranged on a radial lateral surface of the annular body and faces away from the contact portion with respect to the direction of the axis, wherein
  the annular body has an anti-friction coating on the contact portion,
  characterized in that
  a surface portion which is limited in the axial direction is provided on the trough portion and covers only a part of the trough portion, this surface portion having an increased adhesion-promoting effect with respect to a soft sealing ring which can be placed there, in particular due to the presence of an adhesion-promoting supplementary material and/or due to the presence of an adhesion-promoting surface structure; and in that
  a protective coating is provided on the annular body in a radial surface portion which lies between, on the one hand, the trough portion and, on the other hand, the contact portion.

36. The hard sealing ring according to claim 35, wherein on the radial lateral surface of the annular body, in particular in the region of the trough portion, there are surface portions which are adjacent to one another in the axial direction (A) and have a different adhesion promoting effect.

37. The hard sealing ring according to claim 35, wherein the annular body has a cavity in the cross section, which on the one hand faces away from the contact portion and on the other hand faces away from the trough portion.

38. The hard sealing ring according to claim 35, wherein the annular body has a band collar in the cross section at the trough portion towards a side of the contact portion, and wherein the protective coating is provided on a radial circumferential surface of said band collar.

39. The hard sealing ring according to claim 35, wherein the anti-friction coating comprises a wear-resistant permanent sliding layer formed by a metal-matrix composite, wherein the metal-matrix composite comprises a binder matrix with embedded hard particles.

40. The hard sealing ring according to claim 39,
  wherein the embedded hard particles comprise one or more of the following:
  Carbides, in particular metal carbides, further in particular:
    Chromium carbides;
    iron carbides;
    Tungsten carbides;
    Titanium carbides;
    Silicon carbides;
  Oxides, in particular metal oxides, further in particular:
    Aluminum oxides;
    Zirconium oxides;
  Nitrides, in particular metal nitrides, further in particular:
    Boron nitrides.

41. The hard sealing ring according to claim 39,
  wherein the binder matrix is formed from:
  a nickel base;

a nickel-chromium base;

a cobalt base; or a iron base.

42. The hard sealing ring according to claim 39, wherein the wear-resistant permanent sliding layer includes an additional self-lubricant, in particular comprising at least one of the following substances or their compound:

Molybdenum;

copper;

boron;

molybdenum sulfide;

bronze;

brass;

graphite;

boron nitrite (especially hexagonal boron nitrite); or

PTFE.

43. The hard sealing ring according to claim 35, wherein the anti-friction coating comprises a separate running-in layer.

44. The hard sealing ring according to claim 35, wherein a running-in layer comprises:

graphite or a soft metal such as lead, copper, zinc, tin or aluminum in pure form or as an alloy; AND/OR comprises graphite or a soft metal such as lead, copper, zinc, tin or aluminum in a metal matrix.

45. The hard sealing ring according to claim 35, wherein the anti-friction coating comprises at least one graded coating layer having an inhomogeneous material structure, wherein the inhomogeneous material structure of the at least one graded coating layer comprises at least two zones in cross section and in the direction of the axis and in which different material mixtures and/or different concentrations of hard particles and/or self-lubricants are present.

46. The hard sealing ring according to claim 45, wherein there is a gradual transition of the concentration(s) of the hard particles and/or the self-lubricants between the zones.

47. The hard sealing ring according to claim 35, wherein the protective coating consists at least partially of the same material as the anti-friction coating on the contact portion.

48. The hard sealing ring according to claim 35, wherein the annular body is formed:

of a metal material; AND/OR of a plastic material.

49. The hard sealing ring according to claim 35, wherein the annular body is formed at least in part by primary forming, in particular by casting a metal material, further in particular by aluminum die casting.

50. The hard sealing ring according to claim 35, wherein the trough portion comprises a lateral support area located in the direction of the axis on a side of a central region remote from the contact portion.

51. The hard sealing ring according to claim 50, wherein the lateral support area is formed in an initial shape as a collar, a longitudinal extension of which is oriented in cross section in the direction of the axis.

52. The hard sealing ring according to claim 50, wherein a peripheral channel is formed between the lateral support area and the central region of the trough portion, at which a local extremum of a diameter of the peripheral channel is present in the direction of the axis.

53. The hard sealing ring according to claim 50, wherein the lateral support area is formed by a collar whose longitudinal extension in cross section is greater by a factor x than its thickness, wherein x is at least 1.5 and preferably lies between 2 and 4.

54. The hard sealing ring according to claim 50, wherein the lateral support area is additionally bent or flanged with respect to an initial shape for an intended mounting position, so that its longitudinal extension in cross section is inclined towards the trough portion.

55. The hard sealing ring according to claim 35, wherein an undercut is formed on a side of a lateral support area facing away from the trough portion.

\* \* \* \* \*